(12) United States Patent
Faaborg et al.

(10) Patent No.: US 8,938,394 B1
(45) Date of Patent: Jan. 20, 2015

(54) AUDIO TRIGGERS BASED ON CONTEXT

(71) Applicant: Google Inc., Mountain View, CA (US)

(72) Inventors: Alexander Faaborg, Mountain View, CA (US); Daniel Marc Gatan Shiplacoff, Los Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/151,500

(22) Filed: Jan. 9, 2014

(51) Int. Cl.
*G10L 21/00* (2013.01)

(52) U.S. Cl.
CPC ........................................ *G10L 21/00* (2013.01)
USPC ........... 704/275; 704/270; 704/271; 704/272; 704/273; 704/274

(58) Field of Classification Search
USPC .................................................. 704/270–275
See application file for complete search history.

(56) References Cited

U.S. PATENT DOCUMENTS

| 8,359,020 | B2 | 1/2013 | LeBeau et al. | |
|---|---|---|---|---|
| 8,453,058 | B1 | 5/2013 | Coccaro et al. | |
| 2008/0294798 | A1* | 11/2008 | Lynch | 709/248 |
| 2008/0305780 | A1* | 12/2008 | Williams et al. | 455/414.1 |
| 2009/0088138 | A1* | 4/2009 | Jung et al. | 455/414.1 |
| 2010/0312547 | A1* | 12/2010 | Van Os et al. | 704/9 |
| 2011/0263240 | A1* | 10/2011 | Featherstone et al. | 455/418 |
| 2012/0034904 | A1* | 2/2012 | LeBeau et al. | 455/414.1 |
| 2012/0035931 | A1* | 2/2012 | LeBeau et al. | 704/251 |
| 2012/0296909 | A1* | 11/2012 | Cao et al. | 707/737 |
| 2013/0006638 | A1* | 1/2013 | Lindahl | 704/251 |
| 2013/0054228 | A1* | 2/2013 | Baldwin et al. | 704/9 |
| 2013/0095805 | A1* | 4/2013 | LeBeau et al. | 455/414.1 |
| 2013/0297547 | A1* | 11/2013 | Ding et al. | 706/46 |
| 2013/0304473 | A1* | 11/2013 | Baldwin et al. | 704/257 |

\* cited by examiner

*Primary Examiner* — Leonard Saint Cyr
(74) *Attorney, Agent, or Firm* — Shumaker & Sieffert, P.A.

(57) ABSTRACT

A computing device includes at least one processor and at least one module, operable by the at least one processor, to determine a context of the computing device, the context including an indication of at least one of an application executing at the computing device and a location of the computing device and determine, based at least in part on the context, one or more contextual audio triggers usable to initiate interaction with the computing device, each of the one or more contextual audio triggers being associated with a respective operation of the computing device. The at least one module is further operable to receive audio data, and responsive to determining that a portion of the audio data corresponds to a particular contextual audio trigger from the one or more contextual audio triggers, perform the respective operation associated with the particular contextual audio trigger.

18 Claims, 6 Drawing Sheets

AUDIO TRIGGERS BASED ON CONTEXT

BACKGROUND

Computing devices (e.g., mobile phones, tablet computers, etc.) may enable a user to provide audio input. In some cases, the audio input may cause the computing device to perform one or more actions associated with the received input, such as executing an application or making a telephone call. Typically, in order to enable processing of audio data to identify a particular action, the computing device must receive input to enter an audio input mode in order to avoid performing unintended actions. For example, the computing device may determine whether the audio data includes a default audio trigger or "hot word" to cause the computing device to enter into the audio input mode.

SUMMARY

In one example a method includes determining, by a computing device, a context of the computing device, the context including an indication of at least one of an application executing at the computing device and a location of the computing device, and determining, by the computing device, based at least in part on the context, one or more contextual audio triggers usable to initiate interaction with the computing device, each of the one or more contextual audio triggers being associated with a respective operation of the computing device. The method may further include receiving, by the computing device, audio data, and responsive to determining that a portion of the audio data corresponds to a particular contextual audio trigger from the one or more contextual audio triggers, performing, by the computing device, the respective operation associated with the particular contextual audio trigger.

In another example a computing device includes at least one processor, and at least one module, operable by the at least one processor, to determine a context of the computing device, the context including an indication of at least one of an application executing at the computing device and a location of the computing device, and determine, based at least in part on the context, one or more contextual audio triggers usable to initiate interaction with the computing device, each of the one or more contextual audio triggers being associated with a respective operation of the computing device. The at least one module may be further operable by the at least one processor to receive audio data, and responsive to determining that a portion of the audio data corresponds to a particular contextual audio trigger from the one or more contextual audio triggers, perform the respective operation associated with the particular contextual audio trigger.

In another example a computer-readable storage medium is encoded with instructions that, when executed, cause at least one processor to determine a context of the computing device, the context including an indication of at least one of an application executing at the computing device and a location of the computing device, and determine, based at least in part on the context, one or more contextual audio triggers usable to initiate interaction with the computing device, each of the one or more contextual audio triggers being associated with a respective operation of the computing device. The computer-readable storage medium may be further encoded with instructions that, when executed, cause the at least one processor to receive audio data, and responsive to determining that a portion of the audio data corresponds to a particular contextual audio trigger from the one or more contextual audio triggers, perform the respective operation associated with the particular contextual audio trigger.

The details of one or more examples are set forth in the accompanying drawings and the description below. Other features, objects, and advantages will be apparent from the description and drawings, and from the claims.

DETAILED DESCRIPTION

In general, techniques of the present disclosure may enable a computing device to determine, based on a current context of the computing device, commands that are usable to initiate interaction with the computing device. That is, the computing device may predict one or more commands that a user may be likely to use in the current context and may then determine if captured audio data includes one or more of the predicted commands. In instances where the computing device captures audio data that includes a particular one of the predicted commands, the computing device may then perform an operation associated with the particular command. By determining such contextual commands or "audio triggers," the computing device may enable users to provide audio input using a more natural language style by reducing or eliminating the need for the user to instruct the computing device to enter an audio input mode before providing audio input. In other words, the determining of contextual audio triggers by a computing device may enable a user to directly instruct the computing device what to do—instead of the user having to first inform the computing device that he or she is about to provide an audio command (e.g., by pressing a button or speaking a default audio trigger).

Throughout this disclosure, examples are described in which a computing device and/or a computing system may access and/or analyze information (e.g., executing applications, locations, speeds, calendars, communications, audio data, etc.) associated with a computing device only if the computing device receives permission from a user to do so. For example, in situations discussed below in which the computing device may collect or may make use of contextual information associated with a user and/or contextual information associated with the computing device, the user may be provided with an opportunity to provide input to control whether programs or features of the computing device can collect and make use of such information, or to dictate whether and/or how long the computing device may store such information. In addition, if allowed to collect any data, the computing device may treat certain data in one or more ways before the data is stored or used by the computing device and/or a computing system, so that personally-identifiable information is removed. For example, after obtaining location information for the computing device, the geographic location may be generalized (such as to a city, ZIP code, or state level), so that a particular location of the computing device or user cannot be determined. Thus, the user may have control over how information is collected about the user and how information is used by the computing device.

Figure 1:
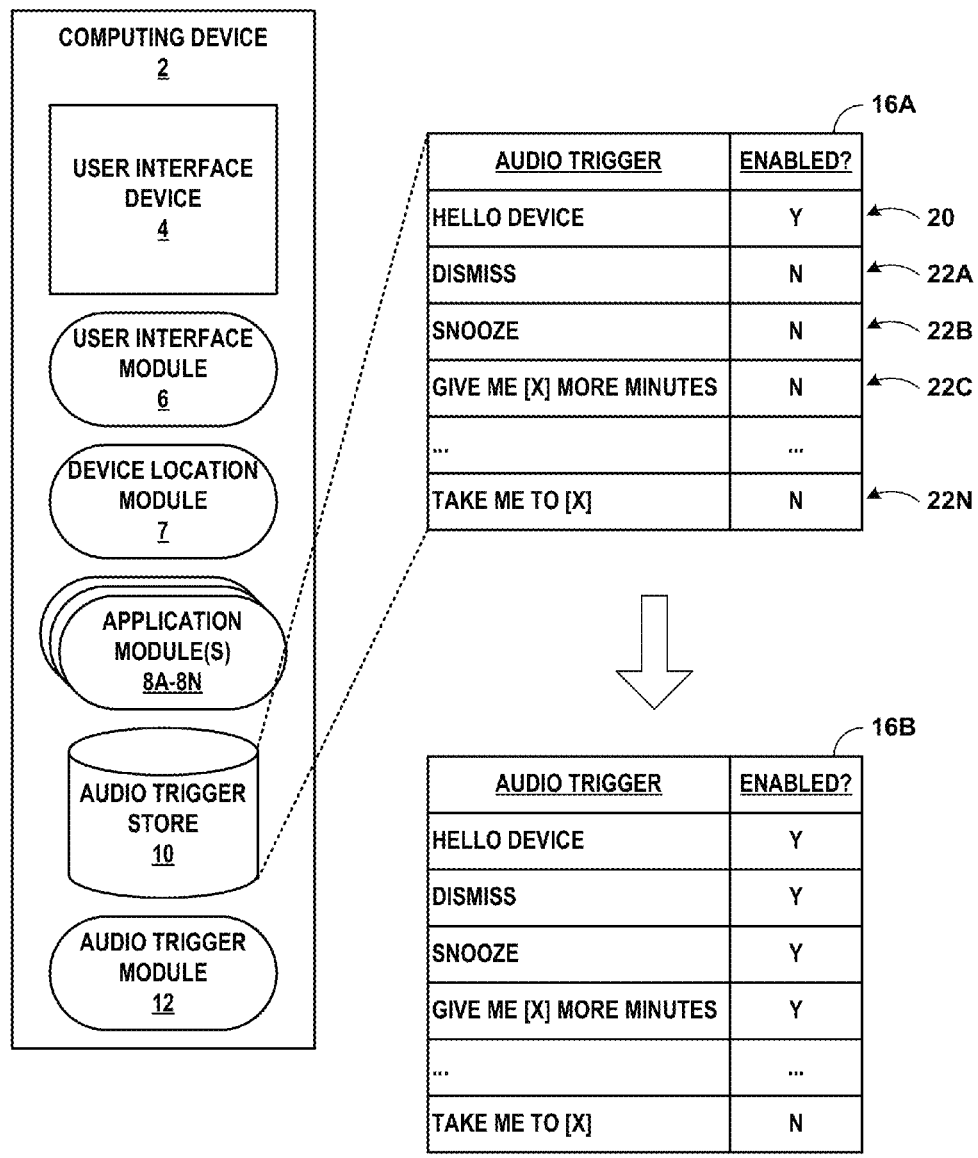
FIG. 1 is a conceptual diagram illustrating an example computing device having contextual audio triggers, in accordance with one or more techniques of the present disclosure.

FIG. 1 is a conceptual diagram illustrating an example computing device 2 having contextual audio triggers, in accordance with one or more techniques of the present disclosure. Examples of computing device 2 may include, but are not limited to, portable, mobile, or other devices, such as mobile phones (including smartphones), laptop computers, desktop computers, tablet computers, smart television platforms, personal digital assistants (PDAs), server computers, mainframes, and the like. For instance, in the example of FIG. 1, computing device 2 may be a smartphone.

Computing device 2, as shown in the example of FIG. 1, includes user interface (UI) device 4. UI device 4 of computing device 2 may be configured to function as an input device and/or an output device for computing device 2. UI device 4 may be implemented using various technologies. For instance, UI device 4 may be configured to receive input from a user through tactile, audio, and/or video feedback. Examples of input devices include a presence-sensitive display, a presence-sensitive or touch-sensitive input device, a mouse, a keyboard, a voice responsive system, video camera, a microphone, an audio sensor, or any other type of device for detecting a command from a user.

UI device 4 may additionally or alternatively be configured to function as an output device by providing output to a user using tactile, audio, or video stimuli. Examples of output devices include a sound card, a video graphics adapter card, or any of one or more display devices, such as a liquid crystal display (LCD), dot matrix display, light emitting diode (LED) display, organic light-emitting diode (OLED) display, e-ink, or similar monochrome or color display capable of outputting visible information to a user of computing device 2. Additional examples of an output device include a speaker, a cathode ray tube (CRT) monitor, a liquid crystal display (LCD), or other device that can generate intelligible output to a user. For instance, UI device 4 may present output to a user of computing device 2 as a GUI that may be associated with functionality provided by computing device 2. In this way, UI device 4 may present various user interfaces of applications executing at or accessible by computing device 2 (e.g., an electronic message application, an Internet browser application, etc.). A user of computing device 2 may interact with a respective user interface of an application to cause computing device 2 to perform operations relating to a function.

In the example of FIG. 1, computing device 2 includes user interface (UI) module 6, device location module 7, application modules 8A-8N (collectively "application modules 8"), and audio trigger module 12. Modules 6, 7, 8, and/or 12 may perform operations described herein using hardware, software, firmware, or a mixture thereof residing in and/or executing at computing device 2. Computing device 2 may execute modules 6, 7, 8, and/or 12 with one processor or with multiple processors. In some examples, computing device 2 may execute modules 6, 7, 8, and/or 12 as a virtual machine executing on underlying hardware. Modules 6, 7, 8, and/or 12 may execute as one or more services of an operating system or computing platform or may execute as one or more executable programs at an application layer of a computing platform.

UI module 6, as shown in the example of FIG. 1, may be operable by computing device 2 to perform one or more functions, such as receive input and send indications of such input to other components associated with computing device 2, such as application modules 8. UI module 6 may also receive data from components associated with computing device 2 such as modules 7, 8 and/or 12. Using the data received, UI module 6 may cause other components associated with computing device 2, such as UI device 4, to provide output based on the data. For instance, UI module 6 may receive data from one of application modules 8 to display a GUI.

In the example of FIG. 1, device location module 7 may be operable to determine a current location of computing device 2. For example, computing device 2 may receive signal data from one or more radios of computing device 2 (e.g., global positioning system (GPS) radio, cellular radio, Wi-Fi radio, and the like) and, based on the signal data, determine the current location of computing device 2. In some examples, device location module 7 may determine a relative location and/or determine a current location based on signal triangulation (e.g., a technique for determining a single location based on relative position data received from two or more signals). In some examples, device location module 7 may determine location data as coordinate (e.g., GPS) location data. In other examples, device location module 7 may determine a location as one or more general or relative locations, such as an address, a place, a country, a city, a type of building (e.g., a library, an airport, etc.), a business, etc.

In some examples, device location module 7 may obtain the current location of computing device 2 from one or more other devices (e.g., via a network). For instance, in response to sending a Wi-Fi network identifier, device location module 7 may receive GPS coordinates. Device location module 7 may output location data to other modules of computing device 2 such as applications 8 or audio trigger module 12.

Application modules 8, as shown in the example of FIG. 1, may include functionality to perform any variety of operations on computing device 2. For instance, application modules 8 may include a word processor application, an email application, a web browser application, a multimedia player application, an alarm clock application, a calendar application, an operating system, a distributed computing application, a graphic design application, a video editing application, a web development application, a navigation or mapping application, or any other application.

In the example of FIG. 1, audio trigger store 10 may be a data structure for storing audio triggers. An audio trigger, generally, may be a sound (e.g., a word, a phrase, etc.) that corresponds to a command and is usable to initiate interaction with a computing device. In other words, audio triggers may be commands for which a computing device may monitor environmental audio. Audio trigger store 10 may store audio triggers as text, as audio data, or in any other format usable in accordance with the present disclosure. Audio trigger store 10 may be any data structure capable of storing audio triggers and associated information, such as an array, a linked list, a tree structure, or other data structure. In some examples, audio trigger store 10 may store audio triggers that are currently enabled to be used by a user of computing device 2. In other examples, audio trigger store 10 may store audio triggers usable in various situations. For instance, audio trigger store 10 may store all possible audio triggers and each possible audio trigger may be associated with a variable specifying whether the associated audio trigger is currently active. That is, in some examples audio trigger store 10 may store only currently enabled audio triggers, while in other examples audio trigger store 10 may store more audio triggers.

In some examples, audio trigger store 10 may also store information associated with audio triggers. For instance, audio trigger store 10 may store information indicating whether or not an audio trigger is currently enabled to be used by the user of computing device 2, information defining instructions or operations to be performed if an associated audio trigger is received by computing device 2, or other information as described in the present disclosure. In some examples, audio trigger store 10 may store additional or other types of information.

Audio trigger module 12, as shown in the example of FIG. 1, may be operable to monitor the environment of computing device 2 for audio triggers, such as audio triggers stored in audio trigger store 10. Before monitoring for audio triggers, audio trigger module 12 may require permission from a user of computing device 2. That is, audio trigger module 12 may perform operations to obtain permission from the user prior to monitoring the environment around computing device 2. For instance, audio trigger module 12 may send information to UI module 6 to cause UI device 4 (e.g., a display device) to display a prompt to the user, asking for permission to access audio data from the environment of computing device 2. Audio trigger module 12 may only monitor for audio data in response to receiving confirmation from the user. In some examples, permission to monitor environmental audio may be transient or situation specific. In other examples, permission may be more persistent. That is, in various examples, a user may grant permission to monitor environmental audio for a short duration of time, for a long duration of time, only in specific situations, and/or until the user revokes permission.

In any case, responsive to receiving permission from the user, audio trigger module 12 may cause UI module 6 to obtain a stream of audio data (e.g., audio in the environment) from UI device 4 (e.g., a microphone or other audio sensor). User interface module 6 may send at least a portion of the audio data to audio trigger module 12. Audio trigger module 12 may process the audio data to determine whether an audio trigger is included in the audio data. For instance, audio trigger module 12 may utilize speech recognition techniques to determine text from the audio data, and compare the text to a set of currently enabled audio triggers stored at audio trigger store 12, such as trigger set 16A.

Trigger set 16A, as shown in the example of FIG. 1, may represent the state of audio triggers stored at audio trigger store 10 when computing device 2 is in a default state (e.g., when no context has been determined). Trigger set 16A includes default audio trigger 20 and contextual audio triggers 22A-22N (collectively, "contextual audio triggers 22"). Only default audio trigger 20 is enabled in trigger set 16A. A default audio trigger may be a configurable, permanent (e.g., always enabled) or semi-permanent audio trigger, usable to cause computing device 2 to enter an audio input mode or perform other general operations. Because computing device 2 may regularly (e.g., always or nearly always) monitor for default audio triggers, each default audio trigger may be a word or phrase that is unlikely to be used in normal conversation in order to avoid inadvertent input. Default triggers may be lesser used words and/or a combination of words that are unlikely to appear together. For instance, in the example of FIG. 1, default audio trigger 20 (e.g., "Hello device") may be configured (e.g., by a manufacturer of computing device 2) as such because it is unlikely that a user will say the words "hello device" without intending to cause computing device 2 to perform an operation. While trigger set 16A includes only one default audio trigger in the example of FIG. 1, trigger set 16A may include more or other default audio triggers in other examples. Additional examples of default audio triggers may include a model name of a computing device, a brand name of the computing device, a user-defined name of the computing device, or other trigger words or phrases.

Each of contextual audio triggers 22 may be associated with an operation of computing device 2 that may be relevant in a specific context of computing device 2. In the example of FIG. 1, for instance, contextual audio trigger 22A, "Dismiss," may be associated with an alarm clock application dismissing an alarm notification. As another example, contextual audio trigger 22B, "Snooze," may be associated with an alarm clock application temporarily postponing an alarm notification for an amount of time (e.g., 1 minute, 5 minutes, etc.). In some examples, contextual audio triggers 22 may include variables or user-definable values. For instance, contextual audio trigger 22C, "Give me [X] more minutes," may enable the user to provide a value for [X] when using the contextual audio trigger (e.g., to specify how many minutes the alarm notification should be postponed). As another example, contextual audio trigger 22N, "Take me to [X]," may be associated with a navigation or maps application creating a route to a specified location, [X], and providing directions to the location. In some examples, one or more of contextual audio triggers 22 may be associated with different operations in different contexts. For instance, while contextual audio trigger 22A may be associated with an operation to dismiss an alarm notification in one context, contextual audio trigger 22A may, in other contexts, be associated with an operation to dismiss other notifications, dismiss an incoming call, delete an email message, or other operations.

In the example of FIG. 1, one of application modules 8 (e.g., application module 8A) may be an alarm clock application. Application module 8A may include functionality to allow a user to set an alarm for a specific time and/or place, output an alarm notification at the specific time and/or place, and/or perform other functions. During operation of computing device 2, application module 8A may receive input from UI module 6 (e.g., an indication of input performed at UI device 4) to set an alarm (e.g., for 10:00 AM). Responsive to receiving the input, application module 8A may schedule a process, or otherwise cause computing device 2 to execute application 8A at 10:00 AM in order to output the alarm notification. At 10:00 AM, application 8A may execute at computing device 2 and output the requested alarm notification. For instance, application 8A may send information to UI module 6 to cause UI module 4 to display a GUI. In some examples, application 8A may additionally or alternatively cause UI module 4 to output an audio notification (e.g., an alarm tone).

In accordance with the techniques of the present disclosure, audio trigger module 12 may be operable to determine contextual audio triggers based on a current context of computing device 2. That is, audio trigger module 12 may receive information about computing device 2 and/or about the user of computing device 2, determine a current context of computing device 2, and use the current context to determine contextual audio triggers. Before determining the current context of computing device 2, audio trigger module 12 may require permission from the user of computing device 2. That is, audio trigger module 12 may perform operations to obtain permission from the user prior to obtaining information about computing device 2 and/or about the user. For instance, audio trigger module 12 may send information to UI module 6 to cause UI device 4 (e.g., a display device) to display a prompt to the user, asking for permission to access contextual information. Audio trigger module 12 may only obtain and use contextual information in response to receiving confirmation from the user.

Responsive to receiving confirmation from the user of computing device 2, audio trigger module 12 may obtain information from one or more other components of computing device 2 (e.g., device location module 7, application modules 8, etc.) and use the information to determine the current context. In the example of FIG. 1, for instance, audio trigger module 12 may obtain information from device location module 7 (e.g., an indication of a location of computing device 2) and/or application modules 8 (e.g., an indication of an application executing at computing device 2). In some examples, audio trigger module 12 may additionally or alternatively obtain information from one or more other computing devices. In any case, based on the received information, audio trigger module 12 may determine that computing device 2 is located at a home of the user and that application 8A is now executing at computing device 2 (e.g., causing the output of an alarm notification). In other words, as one example, audio trigger module 12 may determine a current context in which computing device 2 is at home and is executing an alarm clock application.

Based at least in part on the current context of computing device 2, audio trigger module 12 may determine one or more contextual audio triggers relevant to the current context. That is, audio trigger module 12 may predict commands that are likely to be used (e.g., by the user) in a situation defined by the current context and access audio trigger store 10 to modify the set of currently enabled audio triggers. In the example of FIG. 1, for instance, audio trigger module 12 may predict that, when computing device 2 is located at home and is executing an alarm clock application, it is more likely that the user will use a command that addresses the alarm notification. Consequently, audio trigger module 12 may determine contextual audio triggers, and cause audio trigger store to modify the set of currently enabled audio triggers (e.g., from trigger set 16A to trigger set 16B).

Trigger set 16B, as shown in the example of FIG. 1, may represent the set of audio triggers after modification by audio trigger module 12. That is, trigger set 16B may represent the set of audio triggers when computing device 2 is located at home and executing an alarm clock application. As seen in trigger set 16B, default audio trigger 20 is still enabled. Contextual audio triggers 22A-22C are also enabled. Contextual audio trigger 22N, however, remains disabled. Contextual audio trigger 22N may remain disabled as a result of audio trigger module 12 determining that it is unlikely that a user of computing device 2 would use audio trigger 22N in the current context.

In some examples, audio trigger module 12 may determine new or additional contextual audio triggers. That is, while trigger set 16B is shown in the example of FIG. 1 as including the same contextual audio triggers 22 as trigger set 16A, audio trigger module 12 may, in other examples, add new contextual audio triggers, remove contextual audio triggers, or modify information stored at audio trigger store 10 in other ways. In this way, audio trigger module 12 may be able to determine contextual audio triggers for a determined context that is new or previously unexperienced (e.g., when computing device 2 executes a new application, is in a new location, etc.).

In any case, after determining contextual audio triggers 22 audio trigger module 12 may monitor the environment for the enabled audio triggers of trigger set 16B. For instance, audio trigger module 12 may receive audio data from UI module 6, process the received audio data to determine a text representation of the environmental audio, access audio trigger store 10 to obtain the set of currently enabled audio triggers (e.g., as shown in trigger set 16B), and compare the text representation to each enabled audio trigger. In the example of FIG. 1, audio trigger module 12 may determine that the received audio data includes contextual audio trigger 22A. That is, audio trigger module 12 may determine that the user of computing device 2 spoke the word "dismiss." Responsive to determining that the audio data includes contextual audio trigger 22A, audio trigger module 12 may cause one or more components of computing device 2 to perform the operation associated with contextual audio trigger 22A. That is, audio trigger module 10 may send information to application module 8A causing application module 8A to dismiss the alarm notification.

In some examples, after dismissing the alarm notification, application 8A may cease executing at computing device 2. In accordance with the techniques of the present disclosure, audio trigger module 12 may receive information from applications 8 including an indication that application 8A is not executing at computing device 2. Audio trigger module 12 may determine a new current context of computing device 2 and, based on the new current context, audio trigger module 12 may determine a new set of contextual audio triggers. Audio trigger module 12 may then access audio trigger store 10 to once again modify the set of currently enabled audio triggers.

In this way, audio trigger module 12 may enable a user to use more natural language to initiate interaction with computing device 2 and cause computing device 2 to perform operations. By determining contextual audio triggers, audio trigger module 12 may reduce the likelihood that a user will need to use a default audio trigger (e.g., more obscure or less often used words) to initiate interaction. Instead, audio trigger module 12 may determine contextual audio triggers that are relevant to a current context of computing device 2, thereby enabling computing device 2 to respond to words or phrases (or other sounds) that a user might use when interacting with another person. That is, determining contextual audio triggers and monitoring for the contextual audio triggers may enable a computing device to react to language provided in a more natural language manner.

In some examples audio trigger module 12 may cause output of an indication of the determined contextual audio triggers to the user (e.g., for display at UI device 4 or other display device). For instance, computing device 2 may output a graphical indication of one or more of the determined contextual audio triggers for display. In this way, techniques of the present disclosure may help a user to learn contextual audio triggers in various contexts.

While described in the example of FIG. 1 as being performed by one or more components of computing device 2, the techniques of the present disclosure may, in various examples, be performed by one or more other computing devices or computing systems, or by a combination of computing devices. For instance, in some examples, computing device 2 may send an indication of the current context to a remote computing system (e.g., a cloud computing system, a server system, a desktop computer, or other computing system). The computing system may determine contextual audio triggers, and send an indication of at least one contextual audio trigger to computing device 2. Thereafter, computing device 2 may monitor for the at least one contextual audio trigger in the current context.

In some examples, contextual audio triggers may be determined based at least in part on the frequency with which users (e.g., the user of computing device 2 and/or other users) have previously utilized audio input as a command in a situation having a context that is the same or is similar to the current context of computing device 2. For example, a computing system may receive indications of attempted commands (e.g., audio input received while a computing device is in an audio input mode or received audio triggers) from computing device 2 and/or from other computing devices. Each indication may include information identifying a context in which the command was received. Responsive to receiving a request for contextual audio triggers (e.g., from computing device 2) that includes an indication of a particular context, the computing system may determine which commands were received most often in the particular context. In other words, the computing system may determine the contextual audio triggers for computing device 2 based on what commands were used most often in contexts that were similar to or the same as the particular context. In this way, techniques of the present disclosure may enable a computing system to determine contextual audio triggers by aggregating received audio input from various computing devices in order to better determine contextual audio triggers.

In general, a computing device of a user may send information (e.g., an indication of a current context, received audio input, or other information) to a remote computing system only if the computing device receives permission from the user to send the information. For example, in situations in which the computing device may collect, transmit, or may make use of personal information (e.g., contextual information, received audio input, etc.) the user may be provided with an opportunity to control whether programs or features of the computing device can collect such information, and to control whether and/or how the computing device may store and share such information.

In this manner, techniques of the present disclosure may enable a computing device to respond to more natural language input to perform operations. By determining contextual audio triggers, the computing device may allow immediate input of certain commands while reducing the likelihood that the computing device will inadvertently respond to unintended input. In other words, by monitoring the environment of the computing device for the contextual audio triggers, the computing device may enable a user to initiate interaction and cause the computing device to perform operations without the user having to provide any prior input, such as a button press or a default audio trigger. By determining the contextual audio triggers based on the current context, the computing device may increase the likelihood that the user intended the contextual audio trigger to be received as input by the computing device.

Figure 2:
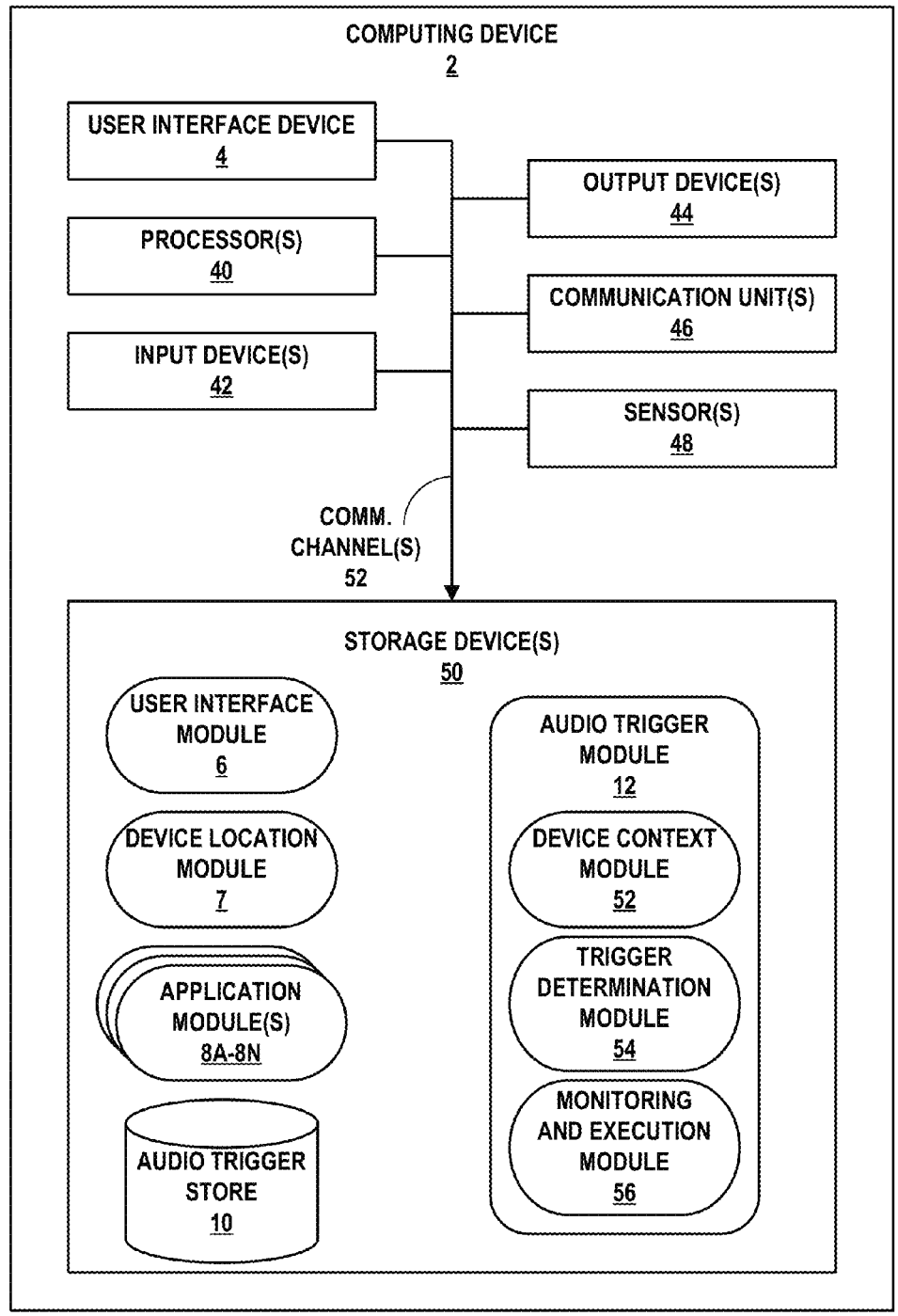
FIG. 2 is a conceptual diagram illustrating details of one example of a computing device having contextual audio triggers, in accordance with one or more techniques of the present disclosure.

FIG. 2 is a conceptual diagram illustrating details of one example of computing device 2 having contextual audio triggers, in accordance with one or more techniques of the present disclosure. The example of FIG. 2 is described below within the context of FIG. 1. FIG. 2 illustrates only one particular example of computing device 2, and many other examples of computing device 2 may be used in other instances. In some examples, computing device 2 may include fewer components than shown in the example of FIG. 2 or additional components not shown in the example of FIG. 2.

As shown in the example of FIG. 2, computing device 2 includes user interface (UI) device 4, one or more processors 40, one or more input devices 42, and one or more output devices 44. Computing device 2 also includes one or more communications units 46, one or more sensors 48, and one or more storage devices 50. Storage devices 50 include user interface (UI) module 6, device location module 7, application modules 8, audio trigger store 10 and audio trigger module 12. Audio trigger module 12 and components thereof may rely on information stored at audio trigger store 10. In other words, as described in more detail below, audio trigger module 12 may be operable by processors 40 to perform read, write, and/or other operations on information stored at audio trigger store 10. Audio trigger module 12 further includes device context module 52, trigger determination module 54, and monitoring and execution module 56.

Communication channels (COMM. CHANNELS) 52 may interconnect components 4, 6, 7, 8, 10, 12, 40, 42, 44, 46, 48, 50, 52, 54, and/or 56 for intercomponent communications (physically, communicatively, and/or operatively). In some examples, communication channels 52 may include a system bus, a network connection, an inter-process communication data structure, or any other method for communicating data.

In the example of FIG. 2, one or more input devices 42 may be operable to receive input. Examples of input are tactile, audio, and video input. Input devices 42, in one example, include a presence-sensitive or touch-sensitive display, a mouse, a keyboard, a voice responsive system, a video camera, a microphone or other audio sensor, or any other type of device for detecting input from a human or machine. In some examples, a presence sensitive input device may detect an object at and/or near a screen. As one example range, a presence-sensitive input device may detect an object, such as a finger or stylus that is within 2 inches or less of the screen. The presence-sensitive input device may determine a location (e.g., an (x,y) coordinate) of a screen at which the object was detected. In another example range, a presence-sensitive input device may detect an object six inches or less from the screen and other ranges are also possible. The presence-sensitive input device may determine the location of the screen selected by a user's finger using capacitive, inductive, and/or optical recognition techniques. In some examples, a presence sensitive input device also provides output to a user using tactile, audio, or video stimuli as described with respect to output devices 44.

One or more output devices 44 may, in the example of FIG. 2, be operable to generate output. Examples of output are tactile, audio, and video output. Output devices 44, in one example, include a presence-sensitive display, sound card, speaker, video graphics adapter card, speaker, cathode ray tube (CRT) monitor, liquid crystal display (LCD), or any other type of device for generating output to a human or to a machine.

In some examples, UI device 4 of computing device 2 may include functionality of input devices 42 and/or output devices 44. For instance, UI device 4 may be or may include a microphone, or other audio sensors operable to receive audio from the environment around computing device 2. While illustrated as an internal component of computing device 2, UI device 4 may also represent an external component that shares a data path with computing device 2 for transmitting and/or receiving input and output. For instance, UI device 4 may represent a built-in component of computing device 2, located within and physically connected to the external packaging of computing device 2 (e.g., a screen on a mobile phone). In another example, UI device 4 represents an external component of computing device 2, located outside and physically separate from the packaging of computing device 2 (e.g., a monitor, a projector, or other display device that shares a wired and/or wireless data path with a tablet computer).

In the example of FIG. 2, one or more communication units 46 may be operable to communicate with external devices via one or more wired and/or wireless networks by transmitting and/or receiving network signals on the one or more networks. Examples of communication units 46 include a network interface card (e.g. such as an Ethernet card), an optical transceiver, a radio frequency transceiver, a GPS receiver, or any other type of device that can send and/or receive information. Other examples of communication units 46 may include Near-Field Communications (NFC) units, Bluetooth radios, short wave radios, cellular data radios, wireless network radios, as well as universal serial bus (USB) controllers.

One or more sensors 48 may, in the example of FIG. 2, be operable to generate data for use by components of computing device 2. Sensors 48 may include any device or component capable of obtaining data about computing device 2, data about an environment in which computing device 2 is situated, data about a user of computing device 2, or other data. That is, any of sensors 48 may be hardware, firmware, software, or a combination thereof for obtaining information. Examples of sensors 48 may include a GPS sensor, a position sensor, an accelerometer or other motion sensor, a camera, a compass, a magnetometer, a light sensor, an infrared sensor, a microphone or other audio sensor, a radiation sensor, a temperature sensor, a barometer, an altimeter, or other data gathering components.

In the example of FIG. 2, one or more storage devices 50 may be operable to store information for processing during operation of computing device 2. For instance, computing device 2 may store data that modules 12, 54, and/or 56 may access during execution at computing device 2. In some examples, storage devices 50 represent temporary memories, meaning that a primary purpose of storage devices 50 is not long-term storage. For instance, storage devices 50 of computing device 2 may be volatile memory, meaning that storage devices 50 may not retain stored contents if powered off. Examples of volatile memories include random access memories (RAM), dynamic random access memories (DRAM), static random access memories (SRAM), and other forms of volatile memories known in the art.

Storage devices 50, in some examples, also include one or more computer-readable storage media. Storage devices 50 may be configured to store larger amounts of information than volatile memory. Storage devices 50 may further be configured for long-term storage of information. In some examples, storage devices 50 include non-volatile storage elements, meaning that storage devices 50 may maintain information through power on/power off cycles. Examples of non-volatile memories include magnetic hard discs, optical discs, floppy discs, flash memories, or forms of electrically programmable memories (EPROM) or electrically erasable and programmable (EEPROM) memories. Storage devices 50 may, in some examples, store program instructions and/or information (e.g., data) associated with modules 6, 7, 8, 12, 52, 54, 56 and audio trigger store 10, such as during program execution.

One or more processors 40 may, in the example of FIG. 2, implement functionality and/or execute instructions within computing device 2. For example, processors 40 may receive and execute instructions stored by storage devices 50 that implement the functionality of modules 6, 7, 8, 12, 52, 54, and/or 56. These instructions, executed by processors 40, may cause computing device 2 to read/write/etc. information stored within storage devices 50 during program execution. Processors 40 may execute instructions of modules 6, 7, 8, 12, 52, 54, and/or 56 to cause computing device 2 to determine a context of computing device 2, determine contextual audio triggers, monitor for audio triggers, and/or perform associated operations. That is, modules 6, 7, 8, 12, 52, 54, and/or 56 may be operable by processors 40 to perform various actions or functions of computing device 2.

In accordance with the techniques described herein, device context module 52 of audio trigger module 12 may perform operations to determine a current context of computing device 2. That is, if given permission by the user of computing device 2, device context module 52 may be operable to obtain information from other components of computing device 2 (e.g., device location module 7, application modules 8, communications units 46, sensors 48, etc.) and/or from other computing devices in order to determine a current context that describes computing device 2, the environment in which computing device 2 is situated, the activities in which computing device 2 is current engaged, a user of computing device 2, the activities in which the user is currently engaged, and/or other information.

As one example, device context module 52 may communicate with UI device 4, UI module 6, and/or input devices 42 to obtain information indicating whether or not the user is interacting with computing device 2. Device context module 52 may communicate with one of communication units 46 (e.g., a Bluetooth radio) and obtain information defining whether or not one or more other computing devices are proximate to computing device 2. Device context module 52 communicate with one or more of sensors 48 to obtain information about the physical environment in which computing device 2 exists (e.g., a light level, an ambient noise level, a temperature level, a humidity level, a location, etc.). In some examples, device context module 52 may not communicate directly with sensors 48. In such examples, device context module 52 may obtain data from modules of computing device 2 (e.g., device location module 7) that process sensor data received from sensors 48.

As another example, device context module 52 may communicate with one or more of application modules 8 to obtain an indication of which (if any) application modules are executing at computing device 2, obtain an indication of any such application that is currently being used by the user (e.g., which applications are being displayed or are in focus), and/or an indication of an activity such application is performing. For instance, device context module 52 may obtain data indicating that application 8B (e.g., an audio player application) and application 8C (e.g., an email client application) are currently executing at computing device 2, application 8C is currently in focus, and application 8B is currently playing an audio track while application 8C is drafting an email. Other example activities which an application may be performing include playing a game, browsing a website, searching for information, booking travel reservations, or other activities. In some examples, device context module 52 may obtain information relating to the activity that an application is performing, such as a recipient or sender of an email being composed or read, a user name or level for a game being played, a title or artist name for a song being played, a website URL being viewed, a search query being executed, or other details.

As yet other examples of information that device context module 52 may use to determine the current context, context module 52 may communicate with application modules 8 and/or communication units 46 to determine contextual information regarding the user of computing device 2. For instance, device context module 52 may obtain information from an email application regarding social network services that the user is a member of, email lists that the user subscribes to, or other information. Device context module 52 may also obtain information from a calendar application regarding appointments the user may have. Device context module 52 may communicate with communications units 46 to obtain information from one or more other computing devices or systems. For instance, if permission is received from the user, device context module 52 may cause communications units 46 to obtain information from a social media service account of the user, an email account of the user, or other sources of information.

Based on the obtained information, device context module 52 may determine a current context. As one example, device context module 52 may determine a current context by determining values for one or more contextual categories, as well as a respective weight for each category. That is, device context module 52 may determine values based on obtained information and weigh each category based on a predicted accuracy and/or a predicted importance of the associated value. For example, contextual categories may indicate a type and/or a name of an application being executed at computing device 2, a location of computing device 2, an indication of a computing device or computing devices that are proximate to computing device 2, an activity or task in which computing device 2 is currently engaging or in which an application executing at computing device 2 is engaging, a time of day or current time, a user identification number for a user of computing device 2, a predicted activity or task in which the user is engaging, a predicted mode of travel of the user, a predicted current availability of the user, or various other information.

A weighting applied to a contextual category may indicate an importance of the value determined for the category. For example, weightings may be defined on a scale (e.g., 0-10, 1-100, or other scale). If a value for a category is predicted to be an important part of the current context and/or determined as very likely to be true, then the category may receive a heavy weight, toward one end of the scale (e.g., 90 out of 100). If a value for a category is not predicted to be very important and/or is determined to include uncertainty, then the category may receive a lighter weight, at the other end of the scale (e.g., 10 out of 100). In this way, device context module 52 may prioritize some information over other information when determining the current context.

In the example of FIG. 2, device context module 52 may determine a value for a current-location category. For instance, based on information (e.g., obtained from device location module 7) indicating that computing device 2 regularly located at a specified location during nighttime hours and that computing device 2 is currently located at the same specified location, as well as information (e.g., obtained from contact information for the user or from an email application of the user) indicating that the user's home address is geographically located in substantially the same specified location, device context module 52 may determine the value "Home" for the current-location category.

Device context module 52 may determine a corresponding weight for the current-location category. In the example of FIG. 2, device context module 52 may determine a relatively heavy weight, as the location information (e.g., based off GPS) is relatively accurate, and there are multiple pieces of information indicating the same result (e.g., that computing device 2 is at the home of the user). In other examples, such as where location information is based on other, less-accurate data (e.g., only a time of day), the value for the current-location category may be weighted less heavily.

Device context module 52 may, in the example of FIG. 2, also determine a value for an executing-applications category, an in-focus-application category, and/or a current-application-activity category. For instance, based on information obtained from applications 8, device context module 52 may determine the values for the executing-applications category and in-focus-application category as a name or application identifier corresponding to application 8A (an alarm clock application). That is, application 8A is the only application executing at computing device 2, and is the currently in-focus application. Device context module 52 may further determine a value of "output alarm notification" for the current-application-activity category. Device context module 52 may assign a heavy weight to each of the executing-applications category, the in-focus-application category, and the current-application-activity category, as this information is unlikely to be incorrect.

In the example of FIG. 2, device context module 52 may also determine a value for proximate-devices category that indicates whether or not any other computing devices are proximate to computing device 2. For instance, device context module 52 may communicate with one or more of communications units 46 (e.g., a Bluetooth radio unit and/or an NFC unit) and determine a value of NULL for the proximate-devices category, indicating that no devices are proximate to computing device 2. Device context module 52 may again determine a relatively heavy weight for the proximate-devices category, based on the fact that information received from the Bluetooth radio unit indicated that Bluetooth capabilities are currently disabled on computing device 2.

In various examples, device context module 52 may determine values and weights for additional contextual categories or alternative contextual categories. In any case, after determining the current context, device context module 52 may provide at least an indication of the current context to trigger determination module 54. For instance, device context module 52 may send data indicating each contextual category, the associated value determined for the category, and the associated weight determined for the category.

Trigger determination module 54 of audio trigger module 12, in the example of FIG. 2, may be operable to receive the indication of the current context from device context module 52 and determine contextual audio triggers based on the current context.

Trigger determination module 54 may determine contextual audio triggers by predicting commands that are likely to be used by the user in the current context. In some examples, trigger determination module 54 may determine contextual audio triggers from a set of known audio triggers. For instance, audio trigger store 10 may include the set of all audio triggers known to computing device 2. That is, audio trigger store 10 may store all audio triggers usable by a user to interact with computing device 2. The audio triggers may be associated with indications of a context (e.g., contextual category values) in which the respective audio trigger was previously used or typically used, one or more operations or instructions that correspond to the audio trigger, and/or other information.

Trigger determination module 54 may analyze the information received from device context module 52 (e.g., information describing the current context) and determine which contextual category values of the current context are weighted the heaviest. Trigger determination module 54 may then access audio trigger store 10 and determine which of the known audio triggers are associated with the heaviest contextual category values of the current context. Trigger determination module 54 may determine contextual audio triggers based on which audio triggers are associated with the heaviest one value of the current context, the heaviest three values, the heaviest five values, etc.

In other examples, trigger determination module 54 may determine contextual audio triggers in other ways. As one example, at installation, each of applications 8 may install a set of commands that correspond to the respective application. To determine contextual audio triggers, trigger determination module 54 may use the received indication of the current context to determine an application that is currently executing at computing device 2, and determine, as contextual audio triggers, the set of commands corresponding to the currently executing application. Trigger determination module 54 may additionally or alternatively determine contextual audio triggers using various other methods in accordance with the techniques of the present disclosure.

While described in the example of FIG. 2 as being located within and executing at computing device 2, at least a portion of trigger determination module 54 may, in other examples, be located at a remote computing device, such as a server device, a cloud computing system, or other system. In such other examples, computing device 2 may establish a connection with the remote computing device in order to provide information (e.g., an indication of the current context) to trigger determination module 54 and/or receive information (e.g., contextual audio triggers) from trigger determination module 54. For instance, components of computing device 2 (e.g., audio trigger module 12, audio trigger store 10, etc.) may be operable to communicate with trigger determination module 54 by sending information to and receiving information from communications units 46.

In some examples, trigger determination module 54 may determine contextual audio triggers based at least in part on how frequently commands were used by one or more users in a previous context that is the same as or similar to the current context. That is, trigger determination module 54 may be operable to track usage of commands (e.g., audio commands and/or audio triggers) at one or more devices (e.g., including computing device 2) and aggregate usage rates to determine which commands are more commonly used in various contexts.

Based on the aggregated usage data, trigger determination module 54 may determine, as contextual audio triggers, those commands that were previously used at least at a threshold rate to provide input in a similar context. That is, audio triggers stored at audio trigger store 10 may additionally or alternatively include indications of a frequency at which the command was previously used (in a voice input mode or as an audio trigger) by users (e.g., include the user of computing device 2). In such example, trigger determination module 54 may determine contextual audio triggers by selecting those audio triggers that are (1) associated with a frequency value that meets or exceeds a threshold, and (2) associated with the proper contextual category value(s).

In the example of FIG. 2, trigger determination module 54 may receive the indication of the current context, and determine, as contextual audio triggers, commands usable to address an alarm clock application, such as contextual audio triggers 22A-22C of FIG. 1. Responsive to determining contextual audio triggers, trigger determination module 54 may access audio trigger store 10 and modify the set of currently enabled audio triggers accordingly. As one example, trigger determination module 54 may access audio trigger store 10 and modify indications associated with each audio trigger determined as a contextual audio trigger to indicate that the audio trigger is a currently enabled contextual audio trigger. Trigger determination module 54 may also modify indications associated with audio triggers that are not determined as contextual audio triggers in order to indicate that the audio triggers are not currently enabled contextual audio triggers. In some examples, trigger determination module 54 may additionally or alternatively enable or disable one or more default audio triggers. In this way, trigger determination module 54 may specify for which audio triggers computing device 2 will monitor environmental audio. In the example of FIG. 2, trigger determination module 54 may modify the indication associated with each of contextual audio triggers 22A-22C to indicate that "Dismiss," "Snooze," and "Give me [X] more minutes" are available audio triggers in the current context. Trigger determination module 54 may ensure that the indication associated with contextual audio trigger 22N, "Take me to [X]," is disabled.

Monitoring and execution module 56 of audio trigger module 12 may, in the example of FIG. 2, be operable to process audio data to determine audio triggers and cause computing device 2 to perform one or more operations corresponding to a received audio trigger (e.g., a default audio trigger or contextual audio trigger). For instance, one or more of input devices 42 and/or sensors 48 may represent a low power or ultra-low power audio microphone capable of receiving continuous audio input. Monitoring and execution module 56 may receive audio data from the microphone, and may process the audio data. In some examples, monitoring and execution module 56 may process the data by performing one or more speech-to-text transformations to obtain textual data corresponding to the received audio data. In other examples, monitoring and execution module 56 may perform other audio analysis to recognize and identify speech, such as performing frequency analysis to identify tonal characteristics or other sonic identifiers present in the audio data.

In any case, monitoring and execution module 56 may use the processed data to determine whether or not a contextual audio trigger is included in at least a portion of the received audio data. That is, monitoring and execution module 56 may access audio trigger store 10 and compare portions of the processed audio data to audio triggers stored at audio trigger store 10 that are associated with an indication that the audio trigger is currently enabled. In the example of FIG. 2, for instance, monitoring and execution module 56 may receive audio data, process the audio data, access audio data store 10, and determine whether anyone has spoken the words "Dismiss," "Snooze," or "Give me [X] more minutes." If monitoring and execution module 56 does not determine that any portion of the audio data includes a contextual audio trigger, monitoring and execution module 56 may determine whether the audio data includes a default audio trigger. If monitoring and execution module 56 determines that the audio data includes a default audio trigger (e.g., "Hello Device"), monitoring and execution module 56 may cause computing device 2 to enter an audio input mode and/or perform other actions unrelated to the present disclosure.

If monitoring and execution module 56 determines that a portion of the audio data includes one of the currently-enabled contextual audio triggers, monitoring and execution module 56 may cause computing device 2 to perform the operation or operations associated with the received contextual audio trigger. For instance, monitoring and execution module 56 may execute instructions that are associated with the received contextual audio trigger. In the example of FIG. 2, for instance, monitoring and execution module 56 may receive and process audio data and determine that the contextual audio trigger "dismiss" is included in a portion of the audio data. Responsive to determining that the contextual audio trigger "dismiss" has been used, monitoring and execution module 56 may access audio trigger store 10 to obtain the relevant instructions, and cause computing device 2 to perform one or more operations specified by the instructions, such as sending information to application 8A instructing application 8A to dismiss the alarm notification. In this way, computing device 2 may determine contextual audio triggers and monitor for use of the determined contextual audio triggers.

In some examples, in response to determining that the audio data includes a contextual audio trigger, monitoring and execution module 56 may modify or add data to audio trigger store 10. For instance, monitoring and execution module 56 may update or modify information associated with the received audio trigger, such as an indication of the frequency of use that is associated with the contextual audio trigger or the context category values associated with the contextual audio trigger. In some examples, monitoring and execution module 56 may additionally or alternatively modify information within audio trigger store 10 in response to receiving an audio command while computing device 2 is in an audio input mode. By updating or modifying audio trigger store 10 when an audio trigger or audio command is received, monitoring and execution module 56 may increase the likelihood that the received audio trigger or audio command will be enabled as a contextual audio trigger in future situations having the same context or a similar context.

In some examples, one or more components of computing device 2 (e.g., modules 12, 52, 54, and/or 56) may communicate with other computing devices in order to update or modify audio trigger store 10. For instance, computing device 2 may periodically receive information indicating aggregated frequency of use information for an audio trigger stored at audio trigger store 10. As another example, computing device 2 may receive information regarding new or additional commands to be added to audio trigger store 10.

Figure 3:
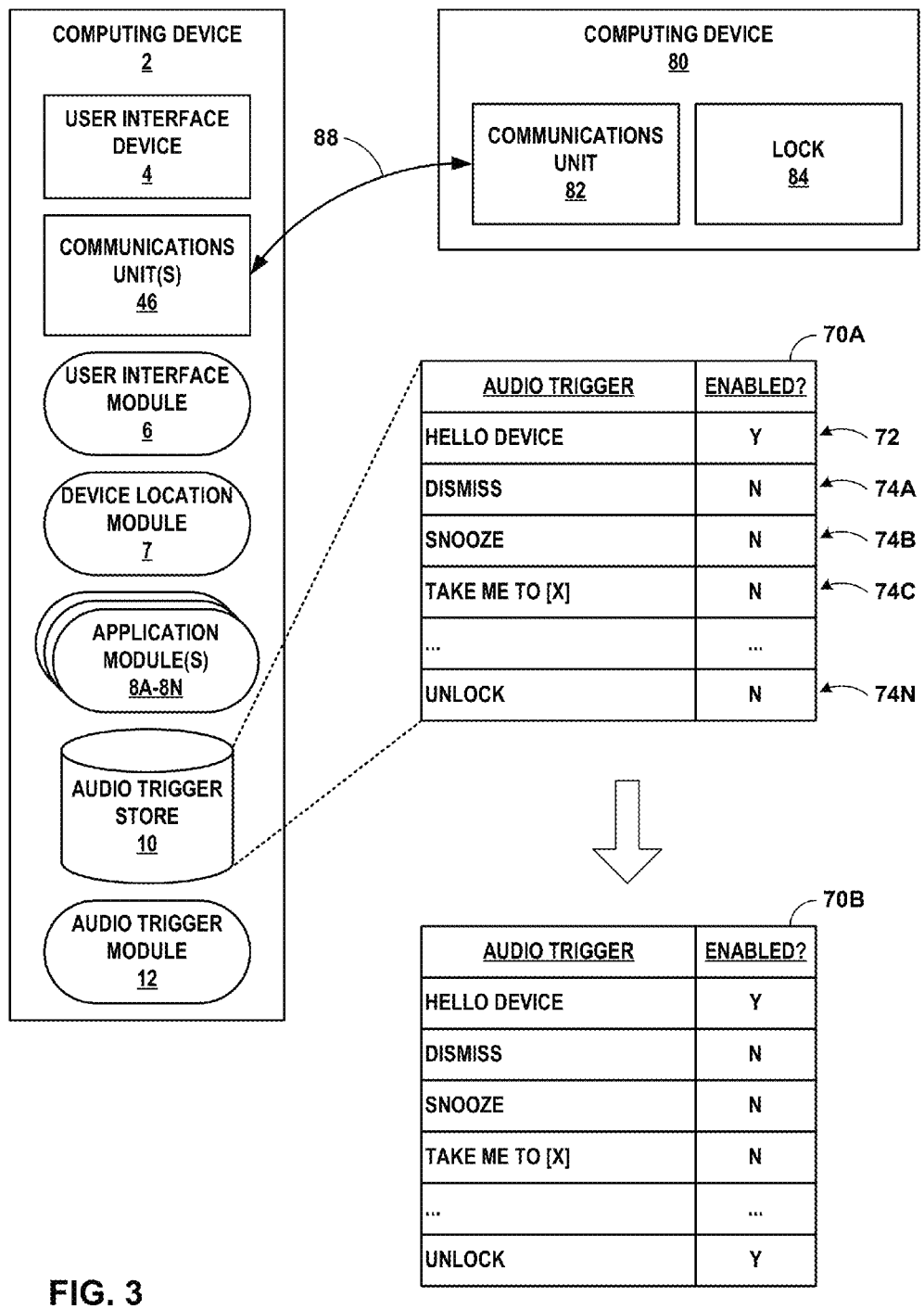
FIG. 3 is a conceptual diagram illustrating an example computing device having contextual audio triggers, in accordance with one or more techniques of the present disclosure.

FIG. 3 is a conceptual diagram illustrating an example of computing device 2 having contextual audio triggers, in accordance with one or more techniques of the present disclosure. The example of FIG. 3 is described below within the context of FIGS. 1 and 2.

The example of FIG. 3 includes computing device 2 and computing device 80. Computing device 2 may have similar functionality to that of computing device 2 as described with respect to FIGS. 1 and 2. Examples of computing device 80 may include, but are not limited to, portable, mobile, or other devices, such as mobile phones (including smartphones), wearable computing devices, laptop computers, desktop computers, tablet computers, smart television platforms, personal digital assistants (PDAs), server computers, mainframes, and the like. Further examples of computing device 80 include a microcontroller unit, an embedded processor embedded within an automobile (e.g., for a hands-free communication system), an electronic locking unit (e.g., a smart lock) or other computing device for a house, an apartment, an automobile, or any other type of device. For instance, in the example of FIG. 3, computing device 80 may be a microcontroller of an automobile.

Computing device 80, as shown in the example of FIG. 3, includes communications unit 82 and lock 84. Communications unit 82 and lock 84 may be operatively coupled to facilitate intercomponent communication. For instance, communications unit 82 and lock 84 may be connected by a system bus or other means for communicating data. While shown in the example of FIG. 3 as being located within computing device 80, communications unit 82 and/or lock 84 may, in other examples, be located external to computing device 80. That is, in some examples, communications unit 82 and/or lock 84 may be external to computing device 80 and may be operatively coupled (e.g., via one or more physical or logical connections) to computing device 80 and/or to one another.

In the example of FIG. 3, communications unit 82 may be operable to facilitate communication with other computing devices (e.g., computing device 2) and cause computing device 80 or components thereof to perform operations based on received instructions. In some examples, communications unit 82 may include functionality similar to that of any of communications units 46 described herein. For instance, communications unit 82 may be a network interface card (e.g. such as an Ethernet card), an optical transceiver, a radio frequency transceiver, a GPS receiver, or any other type of device that can send and/or receive information. Other examples of communication units 46 may include Near-Field Communications (NFC) units, Bluetooth radios, short wave radios, cellular data radios, wireless network radios, as well as universal serial bus (USB) controllers. In other examples, communications unit 82 may include additional or other functionality. In the example of FIG. 3, for instance, communication unit 82 may represent a Bluetooth radio operable to establish a Bluetooth pairing connection with other Bluetooth radios that are within range.

Lock 84, as shown in the example of FIG. 3, may be operable to prevent unauthorized access to a location or resource by restricting access based on received instructions. In some examples, lock 84 may be a physical lock, such as a lock that may be engaged and disengaged through movement of a key, movement of a deadbolt, or other physical manipulation. In other examples, lock 84 may include an electronic lock, such as a restriction on file access, or any other method of preventing unauthorized access. In the example of FIG. 3, lock 84 may represent a door-locking mechanism to control the access to the automobile within which computing device 80 is embedded. That is, lock 84 may be operable to receive instructions to lock or unlock the doors of an automobile and lock or unlock the doors accordingly.

In the example of FIG. 3, audio trigger store 10 of computing device 2 may include audio triggers and associated information as shown in trigger set 70A. For instance, audio trigger store 10 may include default audio trigger 72 and contextual audio triggers 74A-74N (collectively, "contextual audio triggers 74"). As shown in trigger set 70A, default audio trigger 72 may be enabled for current use. Contextual audio triggers 74A, 74B, 74C and 74N may not be enabled. While not shown, others of contextual audio triggers 74 may or may not be enabled, depending on the current context of computing device 2.

Computing device 2 may, in the example of FIG. 3, come near another computing device (e.g., computing device 80) during operation. When computing device 2 is in proximity of computing device 80 (and communications units 46 are enabled), communications units 46 may establish a connection with communication unit 82. For instance, communications units 46 and communication unit 82 may establish a Bluetooth pairing (e.g., connection 88) when within a sufficient distance (e.g., within 100 feet, within ten feet, within six inches, or other distance) of communications unit 82. That is, computing device 2 may be considered proximate to computing device 80 when computing device 2 is within 100 feet of computing device 80, when computing device 2 is within ten feet of computing device 2, when computing device 2 is within six inches of computing device 80, or within some other distance in which short-range communication can be used. In any case, computing device 2 may communicate with computing device 80 via connection 88, when proximate, to obtain information about computing device 80, such as a type of computing device, a current status of computing device 80, options or commands available to interact with computing device 80, and other information.

In accordance with the techniques described herein, computing device 2 (e.g., audio trigger module 12) may determine a current context of computing device 2. For instance, audio trigger module 12 may receive information from one or more other components of computing device 2, such as UI module 6, device location module 7, and/or application modules 8. The information may include an indication of a location of computing device 2, an indication of an application executing at computing device 2, and/or other information.

In the example of FIG. 3, audio trigger module 12 may also receive information from communications units 46. For instance, audio trigger module 12 may receive information indicating the existence of connection 88. Audio trigger module 12 may also receive, from communications units 46, information about computing device 80 (e.g., a unique device identifier of computing device 80, a type of computing device, the available options or commands usable to interact with computing device 80, etc.).

Based at least in part on the information received from communications units 46, audio trigger module 12 may determine the current context of computing device 2. In the example of FIG. 3, the current context may include a contextual category specifying a type of device with which computing device 2 is currently paired via Bluetooth. When computing device 2 is not paired with another device, the value for this category may be empty (e.g., NULL). If computing device 2 is paired with another device, audio trigger module 12 may determine, as a value for the contextual category, the type of device. For instance, device types may include "personal computer," "hands-free system," "mobile device," "control system," or other identifier. In the example of FIG. 3, audio trigger module 12 may determine a value of "control system" for a paired-device-type category based on the information received from communications units 46. Audio trigger module 12 may assigned a heavier weight to the determined value because the information is likely to be true. In some examples, audio trigger module 12 may determine values for additional contextual categories, such as a location of computing device 2 (e.g., "outside work"), an application executing at computing device 2 (e.g., NULL), or other values.

In any case, audio trigger module 12 may determine contextual audio triggers based on the determined current context. For instance, audio trigger module 12 may determine audio triggers stored at audio trigger store 10 that are associated with the contextual category value "control system" and are associated with a frequency of use that meets or exceeds a threshold level. Audio trigger module 12 may enable the determined contextual audio triggers by accessing and modifying information stored at audio trigger store 10.

Trigger set 70B, as shown in the example of FIG. 3, may represent the state of audio triggers stored at audio trigger store 10 after audio trigger module 12 has determined contextual audio triggers. As shown in trigger set 70B, default audio trigger 72 remains enabled and contextual audio triggers 74A, 74B, and 74C remain disabled. Contextual audio trigger 74N has been enabled to reflect that, in the current context, a user may use contextual audio trigger 74N, "Unlock," to initiate interaction with computing device 2 and cause computing device 2 to perform one or more operations associated with contextual audio trigger 74N.

Thereafter, computing device 2 may receive audio input (e.g., at UI device 4). Audio trigger module 12 may receive data indicating the audio input and, in some examples, may process the audio data. Audio trigger module 12 may determine whether at least a portion of the audio data includes contextual audio trigger 74N, "unlock."

Responsive to determining that the audio data includes contextual audio trigger 74N, audio trigger module 12 may cause computing device 2 to perform operations associated with contextual audio trigger 74N. In some examples, operations associated with a contextual audio trigger may include sending instructions to one or more other computing devices to cause the other computing device (or devices) to perform one or more operations. In the example of FIG. 3, for instance, contextual audio trigger 74N may be associated with an operation to cause a connected computing device to unlock a lock. That is, responsive to determining that the audio data includes contextual audio trigger 74N, audio trigger module 12 may send information to computing device 80 (e.g., via connection 88) to cause computing device 80 to transition lock 84 to an unlocked state. Other example contextual audio triggers that may cause another computing device to perform operations include: causing a connected smart television to change a channel; causing a connected a mobile phone to transmit contact information; causing a connected media device to play or pause content; or other operations.

Figure 4:
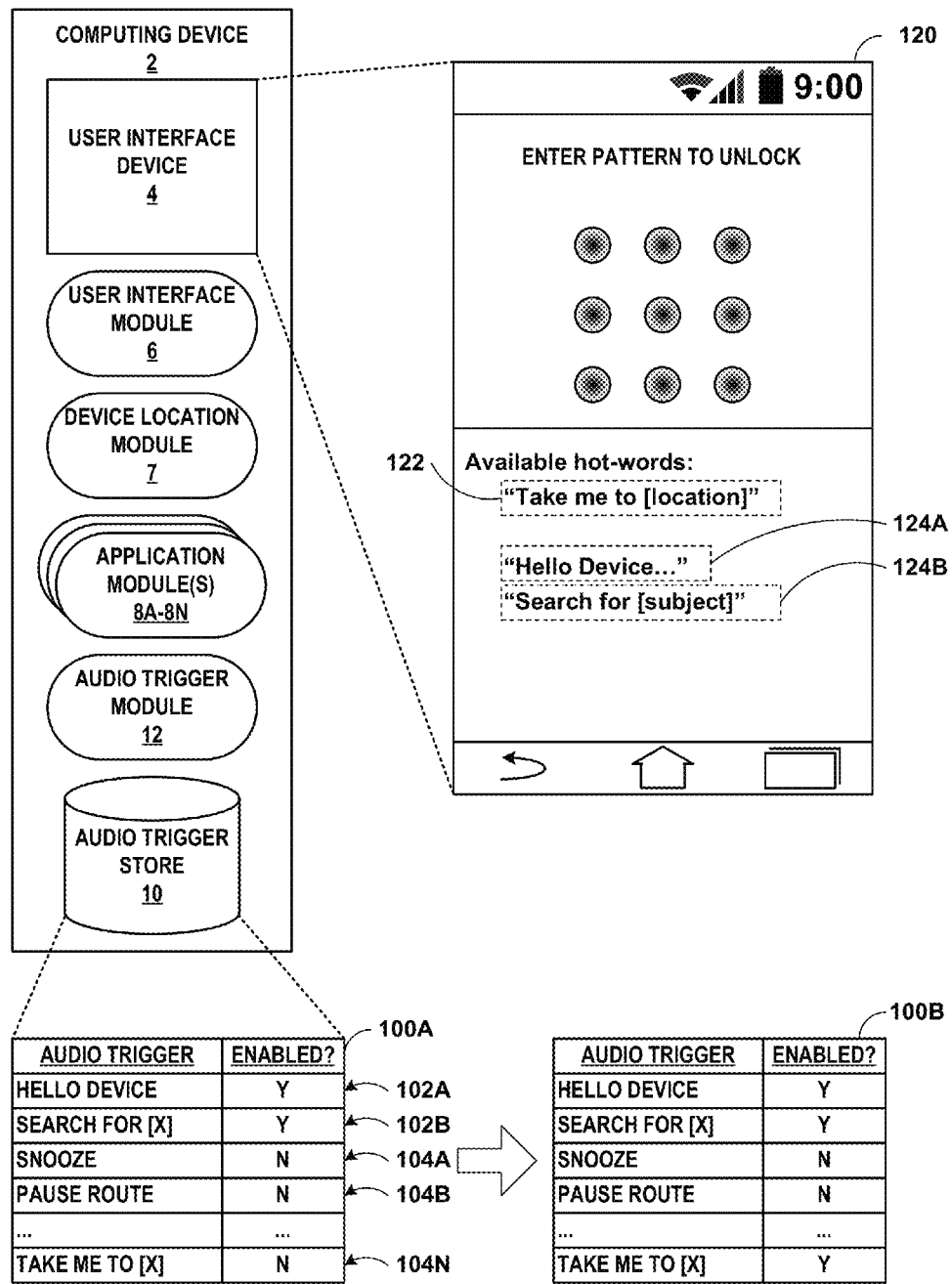
FIG. 4 is a conceptual diagram illustrating an example computing device and GUI for contextual audio triggers, in accordance with one or more techniques of the present disclosure.

FIG. 4 is a conceptual diagram illustrating one example of computing device 2 and GUI 20 for contextual audio triggers, in accordance with one or more techniques of the present disclosure. The example of FIG. 4 is described below within the context of FIGS. 1 and 2.

In the example of FIG. 4, trigger set 100A may represent the state of audio triggers within audio trigger store 10 while computing device 2 is in a default or inactive state. For instance, trigger set 100A may represent the audio triggers of audio trigger store 10 when a context has not been determined for computing device 2. As shown in the example of FIG. 4, trigger set 100A includes default audio triggers 102A and 102B (collectively "default audio triggers 102") and contextual audio triggers 104A-104N (collectively "contextual audio triggers 104"). Each audio trigger within audio trigger store 10 may be associated with one or more operations. For instance, default audio trigger 102A may be associated with an operation to cause computing device 2 to enter an audio input mode. Default audio trigger 102B may be associated with an operation to cause one of applications 8 (e.g., a search application or web browser) to search for an indicated subject. Contextual audio trigger 104A may be associated with causing one of applications 8 (e.g., an alarm clock application) to postpone output of an alarm notification. Contextual audio trigger 104B may be associated with causing one of applications 8 (e.g., a maps application or navigation application) to pause a currently-active navigation route. Contextual audio trigger 104N may be associated with causing the maps application or navigation application to execute and provide a navigation route to an indicated destination.

As shown by trigger set 100A, while computing device 2 is in an inactive or default state, each of default audio triggers 102 is enabled, while each of contextual audio triggers 104 is disabled. That is, while a context has not been determined for computing device 2, no contextual audio triggers may be enabled. In order to provide audio input, a user of computing device 2 may use a default audio trigger (e.g., "hello device") or otherwise indicate to computing device 2 that the user desires to provide audio input (e.g., to cause computing device 2 to enter an audio input mode).

During operation of computing device 2, audio trigger module 12 may determine a current context of computing device 2 in accordance with the techniques of the present disclosure. For instance, audio trigger module 12 may communicate with one or more other components of computing device 2 (e.g., UI module 6, device location module 7, application modules 8) to obtain at least one indication of a location of computing device 2, an indication of applications that are executing at computing device 2, and or other information. Audio trigger module 12 may receive information from UI module 6 indicating that UI device 4 is currently in an inactive state (e.g., a display screen is in a locked state or otherwise not currently in use). Audio trigger module 12 may receive information from device location module 7 indicating a plurality of locations of computing device 2 (e.g., including a current location), as well as an associated time at which each location was recorded. Audio trigger module 12 may receive information from application modules 8 indicating that only an operating system application is executing at computing device 2. In other examples, audio trigger module 12 may receive additional or other information, such as a time of day, information indicating an acceleration of computing device 2, information indicating a proximity of computing device 2 to one or more other computing devices, or other information.

Based on the received information, audio trigger module 12 may determine the current context. In the example of FIG. 4, for instance, audio trigger module 12 may determine that computing device 2 is travelling at a speed of fifty miles per hour based on the plurality of locations and associated times received from device location module 7. Additionally, audio trigger module 12 may determine that the locations geographically correspond to points along an interstate highway. Based on the determined speed and/or the geographical locations, audio trigger module 12 may determine a value of "automobile" for a mode-of-travel contextual category. Audio trigger module 12 may determine that computing device 2 is not in use by the user, based on the information received from UI module 6 and thus may determine an "inactive" value for a device-in-use contextual category. That is, audio trigger module 12 may determine a current context in which computing device 2 is travelling via automobile, and is currently not in use.

Audio trigger module 12 may determine one or more contextual audio triggers based at least in part on the current context. For instance, in the example of FIG. 4, audio trigger module 12 may determine, as contextual audio triggers, commands that are associated with the contextual category values "inactive" (for a device-in-use category) and "automobile" (for a mode-of-travel category). Audio trigger module 12 may access audio trigger store 10 to modify and/or update audio triggers or associated information based on the determination of the contextual audio triggers.

As a result of audio trigger module 12 determining the contextual audio triggers, audio trigger store 10 may be represented by trigger set 100B as shown in the example of FIG. 4. In trigger set 100B, default audio triggers 102 remain enabled. Contextual audio triggers 104A and 104B remain disabled. This may be because contextual audio triggers 104A and 104B were not associated with the correct contextual category values. For instance, it may be unlikely that, when travelling by automobile, the user would desire to cause an alarm clock application to postpone output of an alarm notification. As another example, it may be unlikely that the user would desire to pause a navigation route when computing device 2 is currently inactive (e.g., and is not currently executing a navigation application).

As shown in trigger 100B, contextual audio trigger 104N may be enabled. This may be because contextual audio trigger 104N is associated with the "automobile" and "inactive" contextual category values. That is, it may be likely that when travelling in an automobile, and while computing device 2 is inactive, the user may desire to provide audio input to cause a navigation or maps application to provide directions to an indicated destination.

In the example of FIG. 4, audio trigger module 12 may communicate with UI module 6 to cause UI device 4 to output a graphical indication of available contextual audio triggers for display, as part of GUI 120. GUI 120 includes contextual trigger representation 122 and default trigger representations 124A and 124B (collectively, "default trigger representations 124"). Contextual trigger representation 122 may correspond to contextual audio trigger 104N and default trigger representations 124A and 124B may correspond to default audio triggers 102A and 102B, respectively. Display of contextual trigger representation 122 and default trigger representations 124 may assist a user in learning available audio triggers in various contexts. That is, by outputting a graphical indication of at least one available audio trigger to a user, techniques of the present disclosure may make it easier for users to learn and/or use contextual audio triggers.

In some examples, one or more components of computing device 2 may output graphical indications of available audio triggers (e.g., for display) in response to determining the contextual audio triggers. In other examples, computing device 2 may output graphical indications of available audio triggers in response to determining that the user is looking at or otherwise paying attention to a display device. For instance, computing device 2 may display graphical indications of available contextual audio triggers responsive to determining that the user is interacting with UI device 4. As another example, computing device 2 may include a camera or other photo sensor (not shown). UI module 6 may receive information from the photo sensor that includes an indication of what the user is focused on (e.g., by tracking eye movements or through various other means). UI module 6 may send at least a portion of the information to audio trigger module 12, and audio trigger module 12 may determine whether the user is looking at or paying attention to UI device 4. Responsive to determining that the user is looking at UI device 4, audio trigger module 12 may send an indication of available audio triggers to UI module 6 for display at UI device 4 (e.g., as part of a GUI).

Figure 5:
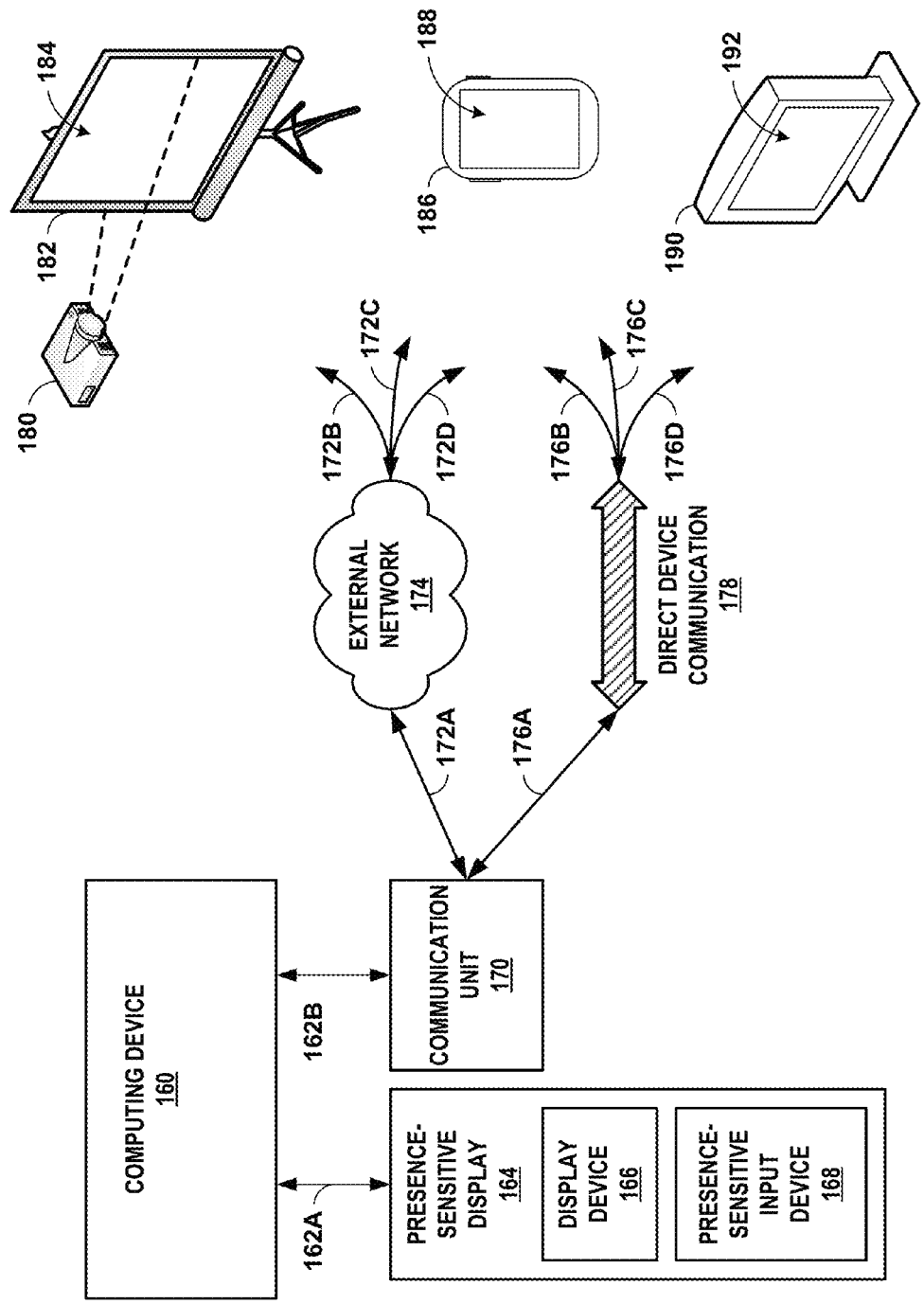
FIG. 5 is a conceptual diagram illustrating an example computing device that outputs graphical content for display at a remote device, in accordance with one or more techniques of the present disclosure.

FIG. 5 is a conceptual diagram illustrating an example computing device that outputs graphical content for display at a remote device, in accordance with one or more techniques of the present disclosure. Graphical content, generally, may include any visual information that may be output for display, such as text, images, a group of moving images, etc. The example shown in FIG. 5 includes a computing device 160, presence-sensitive display 164, communication unit 170, projector 180, projector screen 182, mobile device 186, and visual display device 190. Although shown for purposes of example in FIGS. 1 and 2 as a stand-alone computing device 2, a computing device such as computing device 160 may, generally, be any component or system that includes a processor or other suitable computing environment for executing software instructions and, for example, need not include a presence-sensitive display.

As shown in the example of FIG. 5, computing device 160 may be a processor that includes functionality as described with respect to processors 40 in FIG. 2. In such examples, computing device 160 may be operatively coupled to presence-sensitive display 164 by a communication channel 162A, which may be a system bus or other suitable connection. Computing device 160 may also be operatively coupled to communication unit 170, further described below, by a communication channel 162B, which may also be a system bus or other suitable connection. Although shown separately as an example in FIG. 5, computing device 160 may be operatively coupled to presence-sensitive display 164 and communication unit 170 by any number of one or more communication channels.

In other examples, such as illustrated previously by computing device 2 in FIGS. 1-2, a computing device may refer to a portable or mobile device such as mobile phones (including smart phones), laptop computers, etc. In some examples, a computing device may be a desktop computer, a tablet computer, a smart television platform, a camera, a personal digital assistant (PDA), a server, a mainframe, etc.

Presence-sensitive display 164 may represent one example of UI device 4 of FIGS. 1-4. As shown in FIG. 5, presence-sensitive display 164 includes display device 166 and presence-sensitive input device 168. Display device 166 may, for example, receive data from computing device 160 and display graphical content. In some examples, presence-sensitive input device 168 may determine one or more user inputs (e.g., continuous gestures, multi-touch gestures, single-touch gestures, etc.) at presence-sensitive display 164 using capacitive, inductive, and/or optical recognition techniques and send indications of such user input to computing device 160 using communication channel 162A. In some examples, presence-sensitive input device 168 may be physically positioned on top of display device 166 such that, when a user positions an input unit over a graphical element displayed by display device 166, the location at which presence-sensitive input device 168 corresponds to the location of display device 166 at which the graphical element is displayed. In other examples, presence-sensitive input device 168 may be positioned physically apart from display device 166, and locations of presence-sensitive input device 168 may correspond to locations of display device 166, such that input can be made at presence-sensitive input device 168 for interacting with graphical elements displayed at corresponding locations of display device 166.

As shown in FIG. 5, computing device 160 may also include and/or be operatively coupled with communication unit 170. Communication unit 170 may include functionality similar to that of communication units 46 as described in FIG. 2. Examples of communication unit 170 may include a network interface card, an Ethernet card, an optical transceiver, a radio frequency transceiver, or any other type of device that can send and receive information. Other examples of such communication units may include Bluetooth, 3G, and WiFi radios, Universal Serial Bus (USB) interfaces, etc. Computing device 160 may also include and/or be operatively coupled with one or more other devices, e.g., input devices, output devices, memory, storage devices, etc. that are not shown in FIG. 5 for purposes of brevity and illustration.

FIG. 5 also illustrates a projector 180 and projector screen 182. Other such examples of projection devices may include electronic whiteboards, holographic display devices, and any other suitable devices for displaying graphical content. Projector 180 and projector screen 182 may include one or more communication units that enable the respective devices to communicate with computing device 160. In some examples, the one or more communication units may enable communication between projector 180 and projector screen 182. Projector 180 may receive data from computing device 160 that includes graphical content. Projector 180, in response to receiving the data, may project the graphical content onto projector screen 182. In some examples, projector 180 may determine one or more user inputs (e.g., continuous gestures, multi-touch gestures, single-touch gestures, etc.) at projector screen using optical recognition or other suitable techniques and send indications of such user input using one or more communication units to computing device 160. In such examples, projector screen 182 may be unnecessary, and projector 180 may project graphical content on any suitable medium and detect one or more user inputs using optical recognition or other such suitable techniques.

Projector screen 182, in some examples, may include a presence-sensitive display 184. Presence-sensitive display 184 may include a subset of functionality or all of the functionality of UI device 4 as described in this disclosure. In some examples, presence-sensitive display 184 may include additional functionality. Projector screen 182 (e.g., an electronic whiteboard), may receive data from computing device 160 and display the graphical content. In some examples, presence-sensitive display 184 may determine one or more user inputs (e.g., continuous gestures, multi-touch gestures, single-touch gestures, etc.) at projector screen 182 using capacitive, inductive, and/or optical recognition techniques and send indications of such user input using one or more communication units to computing device 160.

FIG. 5 also illustrates mobile device 186 and visual display device 190. Mobile device 186 and visual display device 190 may each include computing and connectivity capabilities. Examples of mobile device 186 may include e-reader devices, convertible notebook devices, hybrid slate devices, wearable computing devices, etc. Examples of visual display device 190 may include other semi-stationary devices such as televisions, computer monitors, etc. As shown in FIG. 5, mobile device 186 may include a presence-sensitive display 188. Visual display device 190 may include a presence-sensitive display 192. Presence-sensitive displays 188, 192 may include a subset of functionality or all of the functionality of UI device 4 as described in this disclosure. In some examples, presence-sensitive displays 188, 192 may include additional functionality. In any case, presence-sensitive display 192, for example, may receive data from computing device 160 and display the graphical content. In some examples, presence-sensitive display 192 may determine one or more user inputs (e.g., continuous gestures, multi-touch gestures, single-touch gestures, etc.) at projector screen using capacitive, inductive, and/or optical recognition techniques and send indications of such user input using one or more communication units to computing device 160.

As described above, in some examples, computing device 160 may output graphical content for display at presence-sensitive display 164 that is coupled to computing device 160 by a system bus or other suitable communication channel. Computing device 160 may also output graphical content for display at one or more remote devices, such as projector 180, projector screen 182, mobile device 186, and visual display device 190. For instance, computing device 160 may execute one or more instructions to generate and/or modify graphical content in accordance with techniques of the present disclosure. Computing device 160 may output the data that includes the graphical content to a communication unit of computing device 160, such as communication unit 170. Communication unit 170 may send the data to one or more of the remote devices, such as projector 180, projector screen 182, mobile device 186, and/or visual display device 190. In this way, computing device 160 may output the graphical content for display at one or more of the remote devices. In some examples, one or more of the remote devices may output the graphical content at a presence-sensitive display that is included in and/or operatively coupled to the respective remote devices.

In some examples, computing device 160 may not output graphical content at presence-sensitive display 164 that is operatively coupled to computing device 160. In other examples, computing device 160 may output graphical content for display at both a presence-sensitive display 164 that is coupled to computing device 160 by communication channel 162A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 160 and output for display at presence-sensitive display 164 may be different than graphical content display output for display at one or more remote devices.

Computing device 160 may send and receive data using any suitable communication techniques. For example, computing device 160 may be operatively coupled to external network 174 using network link 172A. Each of the remote devices illustrated in FIG. 5 may be operatively coupled to network external network 174 by one of respective network links 172B, 172C, and 172D. External network 174 may include network hubs, network switches, network routers, etc., that are operatively inter-coupled thereby providing for the exchange of information between computing device 160 and the remote devices illustrated in FIG. 5. In some examples, network links 172A-172D may be Ethernet, ATM or other network connections. Such connections may be wireless and/or wired connections.

In some examples, computing device 160 may be operatively coupled to one or more of the remote devices included in FIG. 5 using direct device communication 178. Direct device communication 178 may include communications through which computing device 160 sends and receives data directly with a remote device, using wired or wireless communication. That is, in some examples of direct device communication 178, data sent by computing device 160 may not be forwarded by one or more additional devices before being received at the remote device, and vice-versa. Examples of direct device communication 178 may include Bluetooth, Near-Field Communication, Universal Serial Bus, WiFi, infrared, etc. One or more of the remote devices illustrated in FIG. 5 may be operatively coupled with computing device 160 by communication links 176A-176D. In some examples, communication links 176A-176D may be connections using Bluetooth, Near-Field Communication, Universal Serial Bus, infrared, etc. Such connections may be wireless and/or wired connections.

In one example, computing device 160 may be operatively coupled to mobile device 186 using direct device communication 178. For instance, computing device 160 may be a smartphone that is paired with a wearable computing device via a Bluetooth connection. In accordance with techniques of the present disclosure, computing device 160 may determine contextual audio triggers. In some examples, computing device 160 may output graphical indications of one or more contextual audio triggers for display (e.g., as part of a GUI) at presence-sensitive display 188. For instance, computing device 160 may send data that includes a representation of the contextual audio triggers to communication unit 170. Communication unit 170 may send the data that includes the representation of the contextual audio triggers to visual display device 190 using direct device communication 178. Mobile device 186, in response to receiving the data using direct device communication 178, may cause presence-sensitive display 188 to output the graphical indications of at least one contextual audio trigger.

In some examples, computing device 160 may output graphical indications of contextual audio triggers for display at a display device in response to receiving an indication that a user is currently interacting with the display device (e.g., viewing the display device, providing input at a presence-sensitive display device, etc.). For instance, computing device 160 may receive information from mobile device 186 that indicates the user is currently looking at presence-sensitive display 188. In some examples, the indication may include information from a sensor, such as a facial recognition sensor, an accelerometer, or other sensors. In other examples, the indication may include information from presence-sensitive display 188 itself. In any case, computing device 160 may be operable to display a graphical representation of enabled contextual audio triggers at various display devices, including display devices within the same housing as computing device 160 as well as remote display devices. Such flexibility may allow a user to more easily view graphical representations of enabled contextual audio triggers and learn which contextual audio triggers are available in various contexts.

Figure 6:
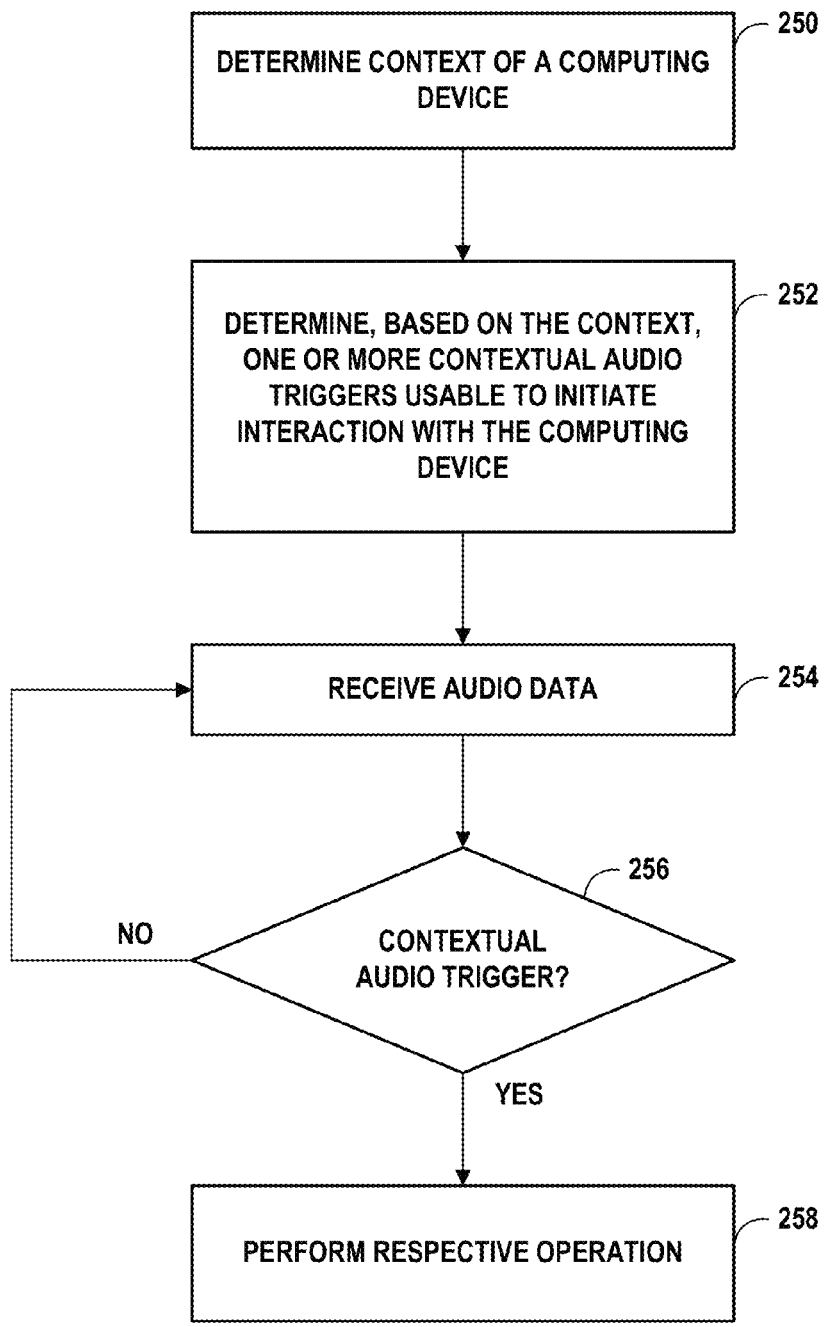
FIG. 6 is a flow diagram illustrating example operations of a computing device having contextual audio triggers, in accordance with one or more techniques of the present disclosure.

FIG. 6 is a flow diagram illustrating example operations of a computing device having contextual audio triggers, in accordance with one or more techniques of the present disclosure. For purposes of illustration only, the example operations of FIG. 6 are described below within the context of FIGS. 1 and 2.

In the example of FIG. 6, computing device 2 (e.g., audio trigger module 12) may determine a context of computing device 2 (250). The context may include an indication of at least one of an application executing at the computing device and a location of the computing device. Based at least in part on the context, computing device 2 may determine one or more contextual audio triggers usable to initiate interaction with the computing device (252). Each of the one or more contextual audio triggers may be associated with a respective operation of the computing device.

Computing device 2 may, in the example of FIG. 6, receive audio data (e.g., (254). Computing device 2 may determine whether the audio data corresponds to any of the contextual audio triggers (256). Responsive to determining that a portion of the audio data does not correspond to a particular contextual audio trigger (NO branch of operation 256), computing device 2 may continue to receive audio data and/or perform one or more operations unrelated to the present disclosure. Responsive to determining that the portion of the audio data corresponds to the particular contextual audio trigger (YES branch of operation 256), computing device 2 may perform the respective operation associated with the particular contextual audio trigger (258).

The example operations of FIG. 6 may further be described by one or more of the examples below.

Example 1

A method comprising: determining, by a computing device, a context of the computing device, the context including an indication of at least one of an application executing at the computing device and a location of the computing device; determining, by the computing device, based at least in part on the context, one or more contextual audio triggers usable to initiate interaction with the computing device, each of the one or more contextual audio triggers being associated with a respective operation of the computing device; receiving, by the computing device, audio data; and responsive to determining that a portion of the audio data corresponds to a particular contextual audio trigger from the one or more contextual audio triggers, performing, by the computing device, the respective operation associated with the particular contextual audio trigger.

Example 2

The method of example 1, further comprising: responsive to determining that the portion of the audio data does not correspond to the particular contextual audio trigger, determining whether the portion of the audio data corresponds to a default audio trigger; and responsive to determining that the portion of the audio data corresponds to the default audio trigger, entering an audio input mode.

Example 3

The method of any of examples 1-2, wherein determining the one or more contextual audio triggers comprises: sending, by the computing device, to a computing system, at least an indication of the context; and receiving, by the computing device and from the computing system, an indication of at least one candidate audio command, wherein the at least one candidate audio command was previously used at least at a threshold frequency in the context.

Example 4

The method of any of examples 1-3, wherein the context includes the indication of the application executing at the computing device, and wherein each of the one or more contextual audio triggers correspond to a respective operation performed by the application executing at the computing device.

Example 5

The method of any of examples 1-4, wherein the context includes the indication of the application executing at the computing device, wherein the application executing at the computing device comprises an alarm clock application, and wherein at least one of the one or more audio triggers correspond to one or more of scheduling an alarm notification, dismissing the alarm notification and postponing the alarm notification.

Example 6

The method of any of examples 1-4, wherein the context includes the indication of the application executing at the computing device, wherein the application executing at the computing device comprises a navigation application, and wherein at least one of the one or more audio triggers correspond to one or more of creating a navigation route, removing the navigation route, pausing the navigation route, progressing to a next instruction of the navigation route, regressing to a previous instruction of the navigation route, adding a destination to the navigation route, and removing the destination from the navigation route.

Example 7

The method of any of examples 1-6, wherein the context further includes an indication of at least one of: a speed at which the computing device is travelling, a time of day, an alert recently output at the computing device, a notification recently output at the computing device, and a proximity of the computing device to one or more other devices.

Example 8

The method of any of examples 1-7: wherein the computing device comprises a first computing device; wherein the context further includes an indication of whether a second computing device is proximate to the first computing device; and wherein one of the one or more contextual audio triggers corresponds to a first operation to cause the second computing device to perform a second operation.

Example 9

The method of example 8, wherein the second operation comprises unlocking a lock operatively coupled to the second computing device.

Example 10

A computing device, comprising means for performing any of the method of examples 1-9.

Example 11

A computer-readable storage medium encoded with instructions that, when executed, cause at least one processor to perform the method recited by any of examples 1-9.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media, which includes any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable storage medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   determining, by a first computing device, a context of the first computing device, the context including an indication that a second computing device is proximate to the first computing device;
   determining, by the first computing device, based at least in part on the context, a subset of contextual audio triggers from a plurality of contextual audio triggers, each contextual audio trigger from the plurality of contextual audio triggers usable to initiate interaction with the first computing device, wherein each contextual audio trigger from the subset of contextual audio triggers is associated with a respective operation of the first computing device and with the context of the computing device, and wherein one of the subset of contextual audio triggers is associated with a first operation to cause the second computing device to perform a second operation;
   receiving, by the first computing device, audio data; and
   responsive to determining that a portion of the audio data corresponds to a particular contextual audio trigger from the subset of contextual audio triggers, performing, by the first computing device, the respective operation associated with the particular contextual audio trigger.

2. The method of claim 1, further comprising:
   responsive to determining that the portion of the audio data does not correspond to any contextual audio trigger from the subset of contextual audio triggers, determining whether the portion of the audio data corresponds to a default audio trigger usable to initiate interaction with the first computing device; and
   responsive to determining that the portion of the audio data corresponds to the default audio trigger, entering an audio input mode.

3. The method of claim 1, wherein determining the subset of contextual audio triggers comprises:
   sending, by the first computing device, to a computing system, at least an indication of the context; and
   receiving, by the first computing device and from the computing system, an indication of at least one candidate audio command, wherein the at least one candidate audio command was previously used at least at a threshold frequency in the context.

4. The method of claim 1,
   wherein the context includes an indication of an application executing at the first computing device, and
   wherein each contextual audio trigger from the subset of contextual audio triggers is associated with a respective operation performed by the application executing at the first computing device.

5. The method of claim 1,
   wherein the context includes an indication of an application executing at the first computing device,
   wherein the application executing at the first computing device comprises an alarm clock application, and
   wherein at least one contextual audio trigger from the subset of contextual audio triggers is associated with one or more of scheduling an alarm notification, dismissing the alarm notification, or postponing the alarm notification.

6. The method of claim 1,
   wherein the context includes an indication of an application executing at the second computing device,
   wherein the application executing at the second computing device comprises a navigation application, and
   wherein at least one contextual audio trigger from the subset of contextual audio triggers is associated with an operation to cause the second computing device to perform one or more of creating a navigation route, removing the navigation route, pausing the navigation route, progressing to a next instruction of the navigation route, regressing to a previous instruction of the navigation route, adding a destination to the navigation route, or removing the destination from the navigation route.

7. The method of claim 1, wherein the context further includes an indication of at least one of: a speed at which the first computing device is travelling, a time of day, an alert recently output at the first computing device, a notification recently output at the first computing device, an application executing at the first computing device, or a location of the first computing device.

8. The method of claim 1, wherein the second operation comprises unlocking a lock operatively coupled to the second computing device.

9. A first computing device, comprising:
   at least one processor; and
   at least one module, operable by the at least one processor, to:
      determine a context of the first computing device, the context including an indication that a second computing device is proximate to the first computing device;
      determine, based at least in part on the context, a subset of contextual audio triggers from a plurality of contextual audio triggers, each contextual audio trigger from the plurality of contextual audio triggers usable to initiate interaction with the first computing device, wherein each contextual audio trigger from the subset of contextual audio triggers is associated with a respective operation of the first computing device and with the context of the first computing device, and wherein one of the subset of contextual audio triggers is associated with a first operation to cause the second computing device to perform a second operation;

receive audio data; and responsive to determining that a portion of the audio data corresponds to a particular contextual audio trigger from the subset of contextual audio triggers, perform the respective operation associated with the particular contextual audio trigger.

10. The first computing device of claim 9, wherein the at least one module is further operable by the at least one processor to:

responsive to determining that the portion of the audio data does not correspond to any contextual audio trigger from the subset of contextual audio triggers, determine whether the portion of the audio data corresponds to a default audio trigger; and responsive to determining that the portion of the audio data corresponds to the default audio trigger, enter an audio input mode.

11. The first computing device of claim 9, wherein the at least one module operable to determine the subset of contextual audio triggers is operable by the at least one processor to:

send, to a computing system, at least an indication of the context; and receive, from the computing system, an indication of at least one candidate audio command, wherein the at least one candidate audio command was previously used at least at a threshold frequency in the context.

12. The first computing device of claim 9, wherein the context includes an indication of an application executing at the first computing device, and wherein each contextual audio trigger from the subset of contextual audio triggers is associated with a respective operation performed by the application executing at the first computing device.

13. The first computing device of claim 9, wherein the context includes an indication of an application executing at the first computing device;

wherein the application executing at the first computing device comprises an alarm clock application, and wherein at least one contextual audio trigger from the subset of contextual audio triggers is associated with one or more of scheduling an alarm notification, dismissing the alarm notification or postponing the alarm notification.

14. The first computing device of claim 9, wherein the context includes an indication of an application executing at the second computing device;

wherein the application executing at the second computing device comprises a navigation application, and wherein at least one contextual audio trigger from the subset of contextual audio triggers is associated with an operation to cause the second computing device to perform one or more of creating a navigation route, removing the navigation route, pausing the navigation route, progressing to a next instruction of the navigation route, regressing to a previous instruction of the navigation route, adding a destination to the navigation route, and or removing the destination from the navigation route.

15. The first computing device of claim 9, wherein the context further includes an indication of at least one of: a speed at which the first computing device is travelling, a time of day, an alert recently output at the first computing device, a notification recently output at the first computing device, an application executing at the first computing device, or a location of the first computing device.

16. A computer-readable storage device encoded with instructions that, when executed, cause at least one processor of a first computing device to:

determine a context of the first computing device, the context including an indication that a second computing device is proximate to the first computing device;

determine, based at least in part on the context, a subset of contextual audio triggers from a plurality of contextual audio triggers, each contextual audio trigger from the plurality of contextual audio triggers usable to initiate interaction with the first computing device, wherein each contextual audio trigger from the subset of contextual audio triggers is associated with a respective operation of the first computing device and with the context of the first computing device, and wherein one of the subset of contextual audio triggers is associated with a first operation to cause the second computing device to perform a second operation;

receive audio data; and responsive to determining that a portion of the audio data corresponds to a particular contextual audio trigger from the subset of contextual audio triggers, perform the respective operation associated with the particular contextual audio trigger.

17. The computer-readable storage device of claim 16, further encoded with instructions that, when executed, cause the at least one processor to:

responsive to determining that the portion of the audio data does not correspond to any contextual audio trigger from the subset of contextual audio triggers, determine whether the portion of the audio data corresponds to a default audio trigger usable to initiate interaction with the first computing device; and responsive to determining that the portion of the audio data corresponds to the default audio trigger, enter an audio input mode.

18. The computer-readable storage device of claim 16, wherein the instructions that cause the at least one processor to determine the subset of contextual audio triggers comprise instructions that cause the at least one processor to determine the subset of contextual audio triggers based at least in part on a frequency with which the plurality of contextual audio triggers were previously used in the context.

* * * * *